United States Patent [19] [11] 4,104,227
Boessler et al. [45] Aug. 1, 1978

[54] FILM FORMING AQUEOUS SYNTHETIC RESIN DISPERSIONS AND PAINTS PREPARED THEREFROM

[75] Inventors: Hanns Boessler, Darmstadt; Wilhelm Elser, Graefenhausen; Klaus Huebner, Ober Ramstadt-Eiche; Hans Ottofrickenstein, Darmstadt-Eberstadt, all of Fed. Rep. of Germany

[73] Assignee: Rohm GmbH, Darmstadt, Fed. Rep. of Germany

[21] Appl. No.: 733,325

[22] Filed: Oct. 18, 1976

[30] Foreign Application Priority Data

Oct. 27, 1975 [DE] Fed. Rep. of Germany ....... 2547970

[51] Int. Cl.[2] ........................................ C08F 26/06

[52] U.S. Cl. .................. 260/29.6 HN; 260/29.6 TA; 526/263

[58] Field of Search ............... 526/263; 260/29.6 HN, 260/29.6 TA

[56] References Cited

U.S. PATENT DOCUMENTS

| | | | |
|---|---|---|---|
| 3,323,980 | 6/1967 | Poschmann et al. | 260/29.6 HN |
| 3,360,506 | 12/1967 | DeBenneville et al. | 526/263 |

*Primary Examiner*—Eugene O. Rzucidlo
*Attorney, Agent, or Firm*—Curtis, Morris & Safford

[57] ABSTRACT

Aqueous film-forming dispersions of a synthetic resin, said resin containing from 0.5 to 5 percent by weight of a heterocyclic comonomer of the formula

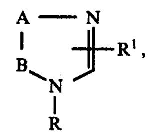

wherein A—B is —C═C— or —CH—CH—; $R^1$ is hydrogen or lower alkyl; and R is an aliphatic group having a polymerizable carbon-carbon double bond therein; water-base paints comprising a pigment and filler dispersed in such an aqueous dispersion; and a method for overpainting substrates of oil-base paints or alkyl resin paints with such a water-base paint.

4 Claims, No Drawings

FILM FORMING AQUEOUS SYNTHETIC RESIN DISPERSIONS AND PAINTS PREPARED THEREFROM

The present invention relates to film-forming aqueous synthetic resin dispersions which are outstandingly suitable as binders for water-based paints, to paints prepared from such dispersions, and to methods of using such paints.

Water-based paints are being increasingly used to exclude fire danger and environmental pollution which are caused by the content of combustible organic solvents in conventional non-aqueous paints. Water-based paints comprising synthetic resin dispersions nevertheless have heretofore had the disadvantage that they do not adhere well to all substrates. Particular difficulties are presented when painting alkyd resin substrates, particularly when the latter are old and weathered.

It is already known from French Pat. No. 7,131,926 that aqueous synthetic resin dispersions give paints which adhere to alkyd resin substrates if unsaturated carboxylic acids and monomers having amino alkyl ester groups are simultaneously present in the structure of the dispersed resin, in which case the amino groups must have at least one free hydrogen atom. In order to be effective, the nitrogen-containing monomers must nevertheless be used in such an amount that other properties become detectably worsened. For instance, these dispersions, or those comprising monomer units of dimethylamino-ethyl methacrylate, tend to the formation of particle agglomerates which limit the storage stability of the dispersions and destroy the adhesion of the film to alkyd resin substrates. These agglomerations can only be surely avoided if the optimum conditions of preparation are precisely maintained, which is generally not possible under plant operating conditions. The resistance to weathering of the films prepared from the dispersions is worsened by the basic comonomers and the tendency toward yellowing is increased. A technically easily preparable synthetic resin dispersion which gives films adhering well to alkyd resin and oil paint surfaces, and which is weather resistant and nonyellowing, has heretofore not been known.

It has now been found that certain five-membered heterocyclic comonomers produce synthetic resin dispersions, films of which adhere extraordinarily well to many substrates, even with smaller contents of nitrogen-containing monomers than otherwise must be present for increasing the adhesion. This is particularly true for adhesion to alkyd- and oil-paint surfaces, even when these are old and weathered. The weathering resistance of the film is better than that of films of comparable adhesion having other basic groups in the polymer. Above all, the stability properties of the dispersions and the adhesion of the films preparable therefrom are not very sensitive to deviations from the optimum preparation conditions which are often unavoidable in large scale production.

The new film-forming aqueous synthetic resin dispersions give films having a dynamic freezing temperature between 0° C. and 90° C., preferably between 15° C. and 50° C. By this term is understood the temperature of the damping maximum in the torsion swing test according to DIN 53445 and which is designated as $T_{\lambda max}$.

The dispersions comprise a continuous water phase and particles, dispersed therein, of a polymer phase which contains from 0.5 to 5 percent by weight of units of a 5-membered heterocyclic comonomer of the general formula

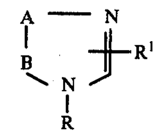

wherein A—B is the group $$-\overset{|}{C}=\overset{|}{C}- \text{ or } -\overset{|}{CH}-\overset{|}{CH}-,$$

R′ is hydrogen or an alkyl group having 1 - 4, preferably 1 or 2, carbon atoms, and R is an aliphatic group having a polymerizable carbon-carbon double bond, as well as at least 0.1 percent, by weight of the dispersion, of an emulsifying agent. R is preferably a vinyl-, isopropenyl-, acryloxyethyl-, or methacryloxyethyl-group. Examples of monomers of this type are N-vinyl-imidazoline, N-vinyl-2-methyl-imidazoline, N-isopropenyl-imidazole, N-isopropenyl-2-ethyl-imidazole, N-methacryloxyethyl-imidazole, and N-acryloxyethyl-imidazoline. In preferred monomers, R is $$-(CH_2CH_2OCO)_n-\overset{R''}{\overset{|}{C}}=CH_2,$$

wherein $n$ is 0 or 1 and R″ is H or $CH_3$. Preferred monomers of this type are N-vinyl-imidazole and N-vinyl-2-methyl-imidazole. The preferred amount is between 1 and 3 percent by weight.

The dynamic freezing temperature, which can be ascertained immediately after film formation, is determining. If the dynamic freezing temperature is fixed only by the structure of the copolymer, which is preferred, then it remains unchanged for any given time after film formation. If, in contrast, the synthetic resin dispersion contains an external plasticizer, the dynamic freezing temperature can gradually climb to a value above 90° C. according to the volatility of the plasticizer. Many technically useful plasticizers have, in any event, such a high molecular weight that they are nonvolatile, so that also in these cases the dynamic freezing temperature does not change over a long period of time.

Synthetic resins which, alone or in combination with a plasticizer, have a dynamic freezing temperature between 0° C. and 90° C., are known in large numbers as binders for paints. They can be prepared in dispersion form if vinyl polymers are involved, i.e. if they are synthetic resins which are obtainable by the free radical emulsion polymerization of vinyl monomers in aqueous emulsion. The dynamic freezing temperature of synthetic resins of this type is only negligibly altered by the use of 0.5 to 5 percent by weight of a heterocyclic comonomer in the starting monomer mixture.

As is known, adjustment to a desired dynamic freezing temperature is achieved without the use of external plasticizers by proper choice of the ratio of different comonomers, which, if polymerized alone, form hard or soft polymers respectively. The lower alkyl methacrylates (having 1 - 3 carbon atoms in the alkyl group), as well as styrene, vinyl toluene, or vinyl chloride, give hard homopolymers, whereas higher alkyl methacrylates (having 4 or more carbon atoms in the alkyl group), as well as alkyl acrylates, above all those having from 2 - 8 carbon atoms in the alkyl group, or vinylidene chloride, or ethylene, form soft homopolymers. Vinyl acetate, vinyl propionate, and methyl acrylate occupy an intermediate position.

Preferably, the polymer phase of the new dispersions comprise more than 80 percent by weight, and particularly preferably more than 90 percent by weight, of units of alkyl acrylates or alkyl methacrylates having 1 - 8 carbon atoms in the alkyl group, styrene, or vinyl esters of saturated carboxylic acids having 2 - 4 carbon atoms. Copolymers comprising at least 50 percent by weight of the aforementioned acrylic esters and methacrylic esters are preferred because of their good weathering behavior. Acrylic acid or methacrylic acid, or acrylonitrile, can also be used in limited amounts.

The polymers can also be cross-linkable, which is achieved either by the incorporation of self-cross-linking comonomer units into the structure, for example those of N-methylol-acrylamide or N-methylol-methacrylamide, or their ethers, or by the incorporation into the structure of comonomer units which react with bifunctional cross-linking agents, for example hydroxyalkyl esters or glycidyl esters of acrylic acid or methacrylic acid, or these acids themselves. These comonomers in general form not more than 10 percent by weight of the polymer.

The synthetic resin dispersions used according to the invention, having a solids content of, for example, 40 - 60 percent by weight, are prepared by methods of emulsion polymerization known per se with the use of at least 0.1 percent by weight of an anionic, cationic, or non-ionic emulsifier or of emulsifier mixtures and, in case it is desired, protective colloids. Typical emulsifiers are sodium-$C_{15}$-paraffin sulfonate, sodium dodecyl benzene sulfonate, sodium lauryl sulfate, sodium cetyl sulfate, sodium oleyl sulfate, and reaction products of isononylphenol, di-isononylphenol, isodecylphenol, di-isobutylphenol, triisobutylphenol, $C_{8-22}$-fatty alcohols, isotridecyl alcohol, castor oil, or stearic acid with a from 3- to 100-fold molar amount of ethylene oxide. Those adducts containing at most 12 ethylene oxide groups may subsequently be sulfated and neutralized. Water-soluble starch decomposition products, especially those obtained by oxidative, hydrolytic, or thermal decomposition, are particularly useful as protective colloids. They are added in amounts of from 0.5 to 5 percent before the beginning of polymerization and have, inter alia, an advantageous influence on the flow properties and the pigment binding capacity of the dispersions. Surprisingly, they raise the blocking point of the coatings which are preparable from the dispersions without a change in the $T_{\lambda max}$ value.

The resin particles in the dispersion prepared in this way have an average particle size between 0.05 to 2 microns.

Because of their good adhesion properties, the dispersions according to the present invention are suitable for the preparation of aqueous paints. for this purpose, they are combined in a manner known per se with pigments, fillers, and conventional auxiliary agents.

Among the pigments, titanium dioxide (rutile type) plays an outstanding role. For non-white paints, the conventional inorganic or organic pigments of high coating power, such as iron oxide pigments or phthalocyanine pigments are added. In addition to the pigments, fillers are usually used, for example carbonate fillers such as chalk, magnesium carbonate, or dolomite, or silicate fillers such as quartz flour, pyrolized silicic acid, mica, or other siliceous mineral flours, or barium sulfate fillers, i.e. barite. For exterior use, pigments and fillers are chosen which give a high resistance to weathering. The weight-ratio of pigments to fillers varies according to the end use of the paint and is between about 1:0 to 1:1 for typical gloss paints, 1:1 to 1:3 for house paints, and 1:2 to 1:10 for interior paints.

For the so-called gloss paints, the pigment-volume-concentration (PVC) is from 10 to 20 volume percent, i.e., the dried paint film contains a content of about 10 to 20 volume percent of pigments and fillers, the balance being essentially the binder. For exterior paints such as house paints, the PVC is 30 to 50 percent. For interior paints it is 50 to 85 volume percent. For exterior paints, pure acrylic resin binders are most usually preferred, whereas for interior paints, for example also styrene-acrylate binders are useful. The paints, particularly the gloss paints, generally contain organic solvents of low volatility and good compatibility with the binder as a flow agent or temporary plasticizer. Typical flow agents are water-soluble glycols such as propylene glycol, glycol ethers, glycol esters, or glycol ether esters. As temporary plasticizers, water-insoluble or slightly water-soluble solvents of the aforementioned type having higher alkyl groups therein are used, for example butyl glycol acetate or butyl diglycol acetate. In the case of styrene-containing binders, aromatic solvents such as xylene are employed. These additives are used in amounts of from 2 to 20 percent by weight of the binder resin and give the paint a good flow and gloss. They eventually evaporate from the finished coat, whereby the coat becomes harder and less sensitive.

Further common additives are water-soluble thickening agents such as methylcellulose, carboxylmethylcellulose, or the alkali salts of polyacrylic or polymethacrylic acids. With their help, the viscosity of the paints is adjusted to the values desired for particular uses within the range from 3,000 to 6,000 centipoises. Acrylic resins of relatively low molecular weight having many carboxy groups also serve as wetting agents to facilitate working in the pigments and fillers. Finally, the additions of conservation agents, particularly fungicides, is common.

The aqueous paints can be applied by painting, rolling, spraying, or dipping onto the most diverse substrates and dry in air to tightly-adherent films. Coatings of cross-linkable dispersions are, if necessary, baked at an elevated temperature. The usual film thicknesses are between 50 microns and 200 microns for the dried layer. With good coating power, a single coat suffices. One can also apply a first coat employing a paint diluted with from 10 to 20 percent of water and, after it has dried, can apply a cover layer of undiluted paint.

On dry, smooth surfaces of primed wood, on masonry, concrete, or plaster, the films adhere well. Strongly chalking or flaking substrates are suitably scraped beforehand and, if necessary, pretreated with a deeply penetrating primer. The outstanding adhesion of the paints to alkyd resin and oil paint substrates is particularly noteworthy, even on old coats of these paints. Adhesion is retained even under the influence of moisture and temperature variations. When painting over old old paint or alkyd resin substrates it is suitable to scrape any strongly-weathered surface before painting. The term "alkyd resin substrates", as employed in the present specification, is to be understood as encompassing coatings which contain, as the binder, condensation products of polyvalent carboxylic acids with polyvalent alcohols, and which may optionally also include higher unsaturated carboxylic acids.

A better understanding of the present invention and of its many advantages will be had by reference to the following specific Examples given by way of illustration.

EXAMPLE 1

(A) Preparation of the Dispersion

An emulsion prepared from 50 parts by weight of n-butyl acrylate, 48 parts by weight of methylmethacrylate, 1 part by weight of N-vinyl-imidazole, 1 part by weight of methacrylic acid, 62 parts by weight of water, 1.5 parts by weight of the sodium salt of a sulfated addition product of triisobutylphenol and 7 mols of ethylene oxide, as well as 0.2 part by weight of ammonium peroxydisulfate, is added over the course of four hours to a solution, warmed to 80° C., of 0.02 part by weight of ammonium peroxydisulfate and 0.5 part by weight of the aforementioned emulsifier in 40 parts by weight of water. A coagulate-free dispersion having a solids content of 50 percent is obtained. $T_{\lambda max}$ = 22° C.

COMPARISON EXAMPLE I

A 50 percent dispersion of a monomer mixture of 50 parts by weight of n-butyl acrylate, 49 parts by weight of methylmethacrylate, and 1 part by weight of methacrylic acid is prepared in the manner described above.

COMPARISON EXAMPLE II

The process according to the Example above is repeated but using, instead of N-vinyl-imidazole, the same amount of dimethylaminoethyl methacrylate. 4,4'-azo-bis-(4-cyanovalerianic acid)-sodium salt is used in the same amount as the initiator instead of ammonium peroxydisulfate.

COMPARISON EXAMPLE III

The process according to Comparison Example II is repeated but the amount of dimethylaminoethyl methacrylate is raised to 3 parts by weight and the amount of methyl methacrylate is reduced to 46 parts by weight.

(B) Preparation of Paints

A dispersion paint is prepared from the following components:

77.5 percent by weight of dispersion;

13.0 percent by weight of titanium dioxide (rutile-type);

8 percent by weight of water;

0.1 percent by weight of cellulose thickener;

0.1 percent by weight of defoaming agent;

0.3 percent by weight of a dispersing agent (ammoniumpolyacrylate);

0.1 percent by weight of a film-forming agent (butylglycol acetate).

(C) Preparation of Paints and Testing

The dispersion paints according to (B) are applied to a polyvinyl chloride film coated with a commercially-available alkyd resin lacquer in a layer thickness of 50 – 70 microns and are dried for seven days at 23° C. and 45 percent humidity.

The adhesion of the coating is determined according to the cross-cut-test according to DIN 53151. The testing conditions are made more precise than in this test to the extent that an adhesive strip is adhered on the test surface and is then subsequently removed. The degree of quality determined in this manner is characterized as the "dry value". The test is repeated after storage under water for 20 minutes and the subsequent result is characterized as the "wet value". The results are reported as follows:

0 — very good adhesion
1 — good adhesion
2 — moderate adhesion
3 — slight adhesion
4 — bad adhesion The wet adhesion of the coating is tested after an alternating stress of about 6 hours of underwater storage at 23° C. and subsequent cold storage for 16 hours at −20° C. The adhesion is determined after five such cycles on the basis of blister formation and bursting open.

The resistance to weathering of the paint is determined after atmospheric exposure of 6 months or 10½ months. In this case, paints having an 80 percent pigment and filler content and a 20 percent binder content (PVC = 80), applied to asbestos cement, were tested. Judgment of the films is based on the chalking behavior, in which the following values were used:

1 — no chalking
2 — little chalking
3 — strong chalking
4 — very strong chalking

RESULTS

| | Paint prepared from Dispersions from | | | |
|---|---|---|---|---|
| | Example | Comparative Examples | | |
| | 1 | I | II | III |
| Cross-cut-test | | | | |
| Dry Value | 0 | 4 | 3 | 0 |
| Wet Value | 0 | 4 | 4 | 0 |
| Wet Adhesion | Free of defects after 5 cycles | Blisters and breaks after 5 cycles | Blisters and breaks after 3 cycles | Good after 5 cycles |
| Resistance to Weathering | | | | |
| 6 months | 1 | — | — | 3 |
| 10.5 months | 2–3 | — | — | 4 |

EXAMPLE 2

The process according to Example 1 is repeated with the difference that the monomer emulsion is added to a solution of 0.5 part by weight of the emulsifier mentioned in Exaple 1. 0.02 part by weight of ammonium peroxydisulfate, and 3 parts by weight of starch decomposed according to Zulkowski [Chem. Berichte, 23, 3295 (1891)] in 43 parts by weight of water. An easily-pigmented coagulate-free dispersion having a solids content of 50 percent is obtained. $T_{\lambda max}$ = 24° C. The paints prepared with this material give particularly blocking-free coatings.

EXAMPLES 3–8

50 parts by weight of n-butylacrylate, 48 parts (46 parts in Example 3) of methylmethacrylate, 1 part by weight of methacrylic acid and 1 part by weight (3 parts by weight in Example 3) of the following heterocyclic comonomers are emulsified in a solution of 1.5 parts by weight of the sodium salt of a sulfated addition product formed between tri-isobutylphenol and seven moles of ethylene oxide and further containing 0.2 parts by weight of ammonium peroxydisulfate. The emulsion is added at 80° C. with stirring over the course of four hours to a solution of 0.02 part by weight of ammonium peroxydisulfate and 0.5 part by weight of the aforementioned emulsifier in 40 parts by weight of water. In all cases, a coagulate-free dispersion is obtained in a concentration of about 50 percent.

The following heterocyclic comonomers are used.

Examples 3 and 4: 1-vinyl-2-methylimidazole;
Example 5: 1-vinyl-2-methylimidazoline;
Example 6: 1-vinyl-4,5-benzimidazole;
Example 7: 2-(1-imidazolyl)-ethylmethacrylate;
Example 8: 2-(1-imidazolyl)-ethylacrylate.

Paints are prepared from these dispersions as in Example 1B, are tested as in Example 1C, and evaluated. The following results were obtained.

| Example | 3 | 4 | 5 | 6 | 7 | 8 |
|---|---|---|---|---|---|---|
| Cross-cut-test (without adhesive strip test) | | | | | | |
| Dry Value | 0 | 0 | 1 | 0 | 0 | 0 |
| Wet Value | 0 | 1 | 1 | 0 | 0 | 0 |
| Wet Adhesion | | | | | | |
| After 2 cycles | good | good | good | good | good | good |
| After 5 cycles | good | good | good | | some wrinkles | |
| $T_\lambda$ max (° C.) | 26° | 23° | 25° | 27° | 22° | 21° |

EXAMPLE 9

A 50 percent dispersion is prepared from a monomer mixture of 73 parts by weight of vinyl acetate, 25 parts by weight of ethyl acrylate, 1 part by weight of methacrylic acid, and 1 part by weight of N-vinylimidazole, in accordance with the teachings in Example 1A. $T_{\lambda max}$ = 19° C. The paint prepared therefrom shows a high adhesion to alkyd resin substrates.

EXAMPLE 10

A monomer mixture of 52 parts by weight of styrene, 46 parts by weight of n-butylacrylate, 1 part by weight of methacrylic acid and 1 part by weight of N-vinylimidazole is polymerized according to the process described in Example 1A. A coagulate-free dispersion having a solid content of about 50 percent is obtained. $T_{\lambda max}$ = 31° C. The dispersion gives an interior paint which is well-adhering to alkyd resin substrates.

What is claimed is:

1. An aqueous film-forming dispersion of a synthetic resin, said dispersion being capable of forming a film having a dynamic freezing temperature between 0°, and 90° C. and comprising a continuous aqueous phase; at least 0.1 percent, by weight of the dispersion, of an emulsifier; and a polymer phase, dispersed in said aqueous phase, said polymer phase comprising particles of an average particle size between 0.05 and 2 microns of a copolymer comprising from 0.5 to 5 percent by weight of units of an imidazole comonomer of the formula

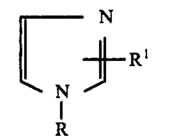

wherein R′ is hydrogen or alkyl having 1 to 4 carbon atoms and R is an aliphatic group having a polymerizable carbon-carbon double bond therein, and more than 80 percent by weight of an alkyl ester of acrylic acid or methacrylic acid having 1 to 8 carbon atoms in the alkyl group thereof or of styrene or a vinyl ester of an saturated carboxylic acid having 2 to 4 carbon atoms.

2. A dispersion as in claim 1 wherein R in said heterocyclic monomer is $$-(CH_2CH_2OCO)_n-\overset{R''}{\overset{|}{C}}=CH_2,$$

wherein $n$ is 0 or 1 and R″ is hydrogen or methyl.

3. A dispersion as in claim 1 wherein said heterocyclic comonomer is N-vinyl-imidazole or N-vinyl-2-methylimidazole.

4. A water-base paint comprising pigment and filler, in a pigment: filler ratio between about 1:0 and 1:10, dispersed in an aqueous film-forming dispersion of a synthetic resin according to claim 1, the pigment-volume-concentration of said paint being from 10 to 85 volume percent.

* * * * *